United States Patent [19]
Yamada

[11] Patent Number: 5,195,272
[45] Date of Patent: Mar. 23, 1993

[54] LID SWITCHING DEVICE

[75] Inventor: Satoshi Yamada, Yokosuka, Japan

[73] Assignee: Kato Hatsujo Kaisha, Ltd., Kanagawa, Japan

[21] Appl. No.: 764,192

[22] Filed: Sep. 23, 1991

[30] Foreign Application Priority Data

Dec. 17, 1990 [JP] Japan .................. 2-411051

[51] Int. Cl.$^5$ .............................................. E05D 15/50
[52] U.S. Cl. ................................... 49/193; 292/303; 292/91; 292/86; 16/231; 267/182
[58] Field of Search .................... 49/192, 193, 382; 292/303, 91, 86, 19; 16/230, 231; 267/157, 164, 182

[56]         References Cited
       U.S. PATENT DOCUMENTS

| | | |
|---|---|---|
| 3,628,217 | 12/1971 | Schaber et al. . |
| 3,724,021 | 4/1973 | Lautenschlaeger . |
| 3,728,819 | 4/1973 | Goldbach et al. . |
| 3,772,736 | 11/1973 | Hettich et al. . |
| 3,977,043 | 8/1976 | Zernig . |
| 3,978,549 | 9/1976 | Vitt . |
| 4,039,822 | 8/1977 | Chan et al. . |
| 4,126,964 | 11/1978 | Anderson . |
| 4,222,149 | 9/1980 | Holbek ............... 49/193 X |
| 4,503,582 | 3/1985 | Gurubatham ........ 49/193 X |
| 4,929,019 | 5/1990 | Pääkkönen et al. ... 49/193 X |
| 4,947,583 | 8/1990 | Inui et al. ............ 49/193 |

FOREIGN PATENT DOCUMENTS

| | | | |
|---|---|---|---|
| 2623779 | 6/1989 | France . | |
| 60-90042 | 6/1985 | Japan . | |
| 304186 | 12/1990 | Japan | 49/193 |
| 686591 | 1/1953 | United Kingdom . | |

Primary Examiner—Renee S. Luebke
Assistant Examiner—Jerry Redman
Attorney, Agent, or Firm—Wenderoth, Lind & Ponack

[57] ABSTRACT

A switching device includes operating members independently movably supported at opposite sides of a lid, a spring having a pair of rotary shaft parts disposed on the inner side of the lid so as to advance or retreat under the influence of the resilient pressure of the spring, and lock members disposed on opposite sides of an opening of a box body so as to detachably fasten the rotary shaft parts thereto. The rotary shaft parts are connected to the operating members so as to urge the operating members outwardly away from each other by virtue of the resilient pressure of the spring and are removed from the lock members by depressing motion the operating members. Owing to the construction, the lid is ensured to produce an infallible shut state on the box body by bringing the rotary shaft parts into engagement with the lock members due to the resilient pressure of the spring. The lid can also be infallibly opened in either of two directions by selectively removing the rotary shaft parts from the lock members by depressing either of the operating members.

8 Claims, 4 Drawing Sheets

LID SWITCHING DEVICE

BACKGROUND OF THE INVENTION

1. Field of the Invention

The present invention relates to a switching device capable of opening and shutting in two directions a lid on an automobile console box or any other lid (inclusive of a door) rotatably disposed on an opening of a box body.

2. Description of the Prior Art

A device for opening and shutting the lid of an automobile console box in two directions has been already disclosed in Japanese Utility Model Public Disclosure No. 60-90042.

The conventional switching device, though not illustrated herein specifically, comprises supporting shafts of a circular cross section disposed integrally along each of the opposite sides of the periphery of an opening of a box body, and bearing parts of a C-shaped cross section suitable for detachable insertion therein of the supporting shafts to thereby enable the lid to shut the opening of the box body by having the bearing parts rotatably inserted around the corresponding supporting shafts. The release of the lid from the opening of the box body is attained by removing one of the bearing parts from the corresponding supporting shaft and rotating the lid about the other supporting shaft as a fulcrum or inversely by removing the other bearing part from the corresponding supporting shaft and, this time, rotating the lid about the other supporting shaft as a fulcrum. Owing to this construction, the opening of a box body can be exposed in two directions.

The conventional switching device allows the box body to be opened and shut selectively in two directions to suit the occasion and, therefore, offers very convenient use as compared with the classic switching device which allows the lid to be opened and shut only in one direction.

The conventional switching device described above indeed has the advantage of enabling the box body to be opened and shut in two directions simply by adopting an extremely simple construction having supporting shafts of a circular cross section disposed on the box body side and bearing parts of a C-shaped cross section disposed on the lid side. In the actual use of this switching device, however, the simplified construction ironically produces an evil effect entailing the following problem.

In the conventional switching device, the bearing part on the side of the lid used for producing an opening or shutting motion must be forcibly inserted around the supporting shaft or conversely must be forcibly released therefrom, and the bearing part on the side of the lid used as the fulcrum for rotation must be immoderately rotated on the supporting shaft. Therefore, it has a serious problem that when the opening and shutting motions are frequently repeated, the C-shaped cross sections of the bearing parts are radially expanded or deformed and eventually prevented from allowing smooth opening and shutting motions or infallibly producing a perfectly open or shut state.

SUMMARY OF THE INVENTION

The main object of the present invention is to provide a switching device which effectively eliminates the problem encountered by the conventional switching device in opening and shutting a lid in two directions and, at the same time, warrants infallible opening and shutting of the lid with a click by making positive use of the resilient pressure of spring means.

To accomplish this object, according to the present invention there is provided a switching device for opening and shutting in two directions a lid rotatably disposed on an opening of a box body. The switching device includes a pair of operating members independently movably supported at each opposite side of the lid, a spring means having a pair of rotary shaft parts disposed on the inner side of the lid so as to be advanced or retreated under the influence of the resilient pressure of the spring means, the rotary shaft parts being respectively connected to the operating members so as to urge the operating members outwardly away from each other by virtue of the resilient pressure of the spring means, and lock members disposed on opposite side edges of the opening of the box body so as to detachably fasten the rotary shaft parts, the rotary shaft parts being removable from the lock members by depressing the operating members.

The above and other objects, characteristic features and advantages of the present invention will become more apparent from the description to be given hereinbelow with reference to the accompanying drawings.

DETAILED DESCRIPTION OF THE PREFERRED EMBODIMENTS

Now, the present invention will be described in detail below with reference to the illustrated embodiments.

A switching device according to the present invention is constructed so as to open and shut in two directions a lid rotatably disposed on an automobile console box.

Figure 1:
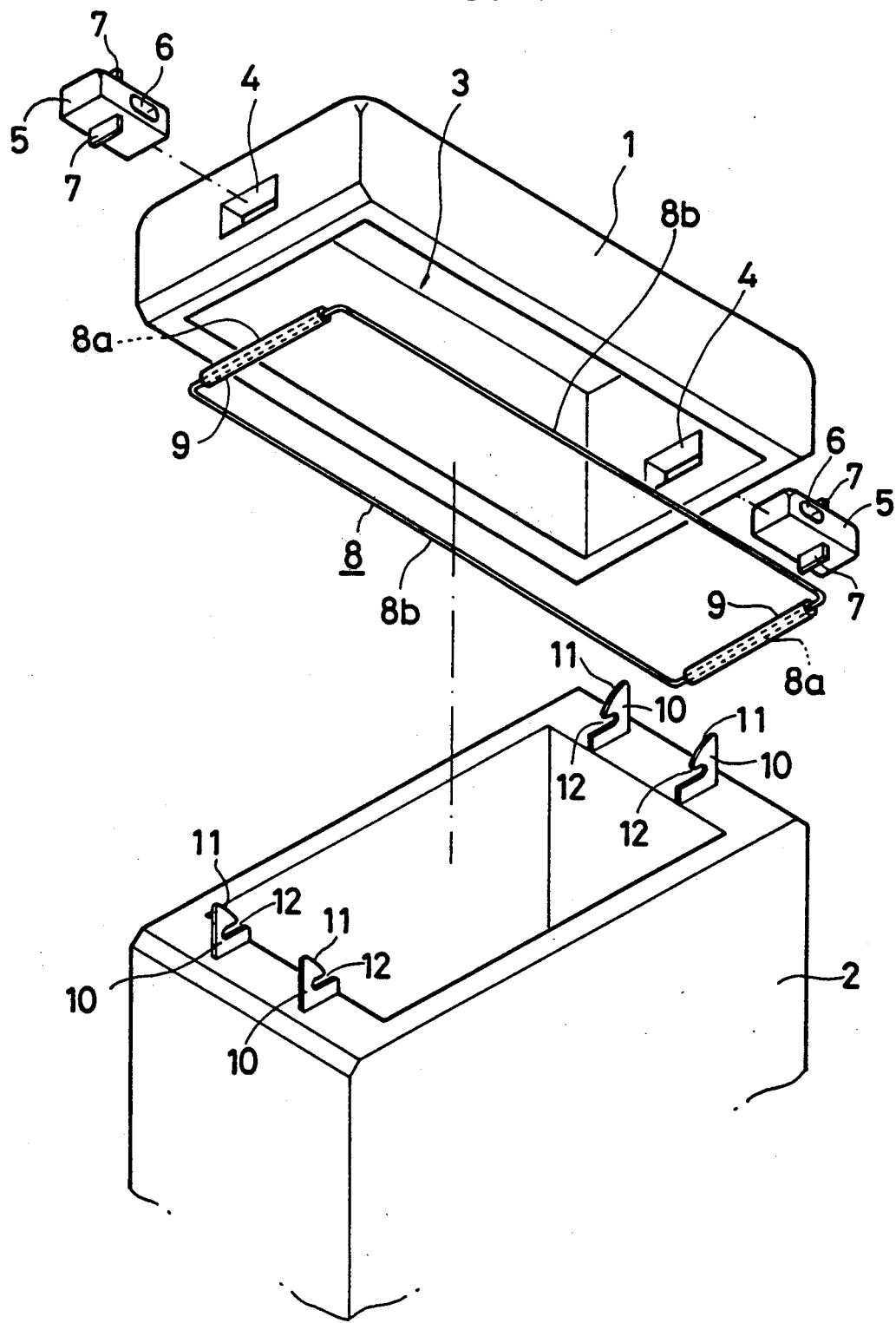
FIG. 1 is an exploded perspective view illustrating one embodiment of the lid switching device according to the present invention.

To be specific, as illustrated in FIG. 1, a lid 1 has a depressed part 3 formed on the inner side thereof. Two through holes 4 are bored in two opposite ones of the four walls defining the depressed part 3. Each of two operating buttons 5 is provided with an oblong hole 6 and stopper parts 7, and is movably supported in one of the through holes 4. A rectangular spring means 8 formed of a wire and provided integrally with a pair of opposed rotary shaft parts 8a and a pair of opposed resilient parts 8b is disposed in a bent state inside the depressed part 3. The pair of rotary shaft parts 8a forming the opposite sides of the rectangular spring means 8 and respectively sheathed in collars 9 are idly inserted in and connected to the oblong hole parts 6 of the operating buttons 5. In this construction, the resilient pressure derived from the bend of the spring means 8 urges the operating buttons 5 outwardly inside the through holes 4 away from each other. However, the operating buttons 5 have their outwardly urged strokes restrained by the collision of their own stopper parts 7 against the inner surface of the opposite walls of the lid 1.

In a box body 2, two pairs of lock members 10 each provided with a tapered guide part 11 and a U-shaped lock hole 12 are disposed upright on opposite ones of the edges enclosing an opening of the box body 2 and located in an aligned relationship, so that the corresponding rotary shaft parts 8a of the spring means 8 are detachably brought into engagement with the lock hole parts 12 of the lock members 10 on the opposite side.

In the lid switching device of this construction, since the operating buttons 5 are supported movably inside the through holes 4 of the lid 1, and the rotary shaft parts 8a of the spring means 8 are idly inserted inside the corresponding oblong holes 6 of the operating buttons 5, the resilient parts 8b of the spring means are bent inwardly inside the depressed part 3 and consequently allowed to urge the operating buttons 5 outwardly until the strokes thereof are restrained by the stopper parts 7.

Figure 2:
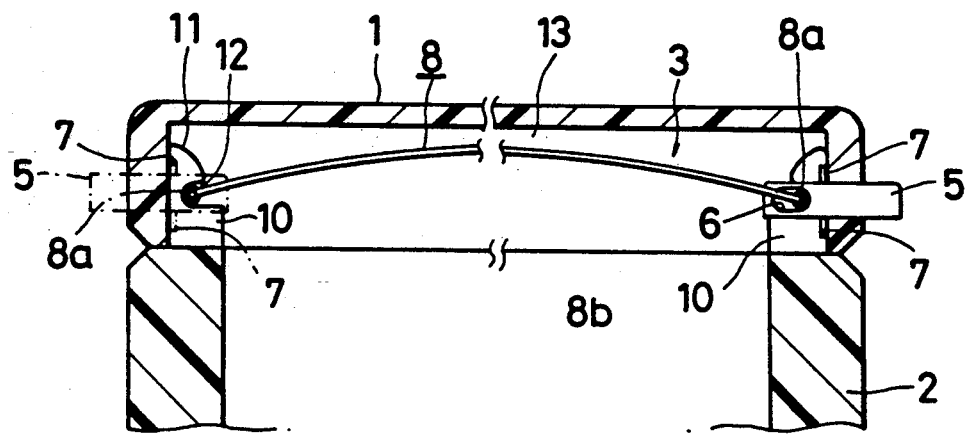
FIG. 2 is a cross section illustrating a state in which a lid is shut on a box body.

When the lid 1 is laid down to shut the opening of the box body 2 in the aforementioned state, the rotary shaft parts 8a of the rectangular spring means 8 are forced inwardly as they are guided by the tapered guide parts 11 of the corresponding lock members 10 and are automatically brought into engagement with the lock holes 12 of the lock members 10. As a result, the lid assumes a shut state on the box body 2 as illustrated in FIG. 2.

This shutting state is constantly retained infallibly because the pair of rotary shaft parts 8a located at the opposite sides of the spring means 8 are kept in resilient engagement in the corresponding lock holes 12 due to the resilient pressure derived from the bend of the pair of resilient parts 8b.

Figure 3:
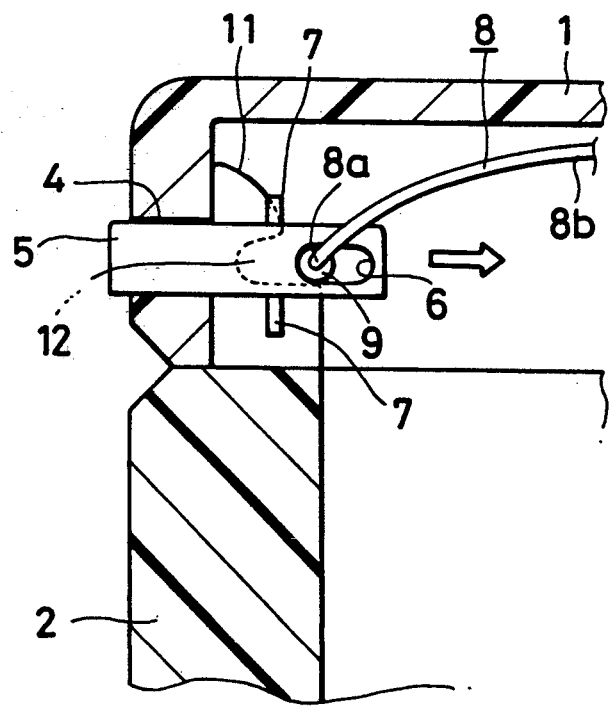
FIG. 3 is an enlarged cross section of an essential part of the embodiment illustrating a state in which a rotary shaft part of a spring means is removed from a lock hole of a lock member.
Figure 4:
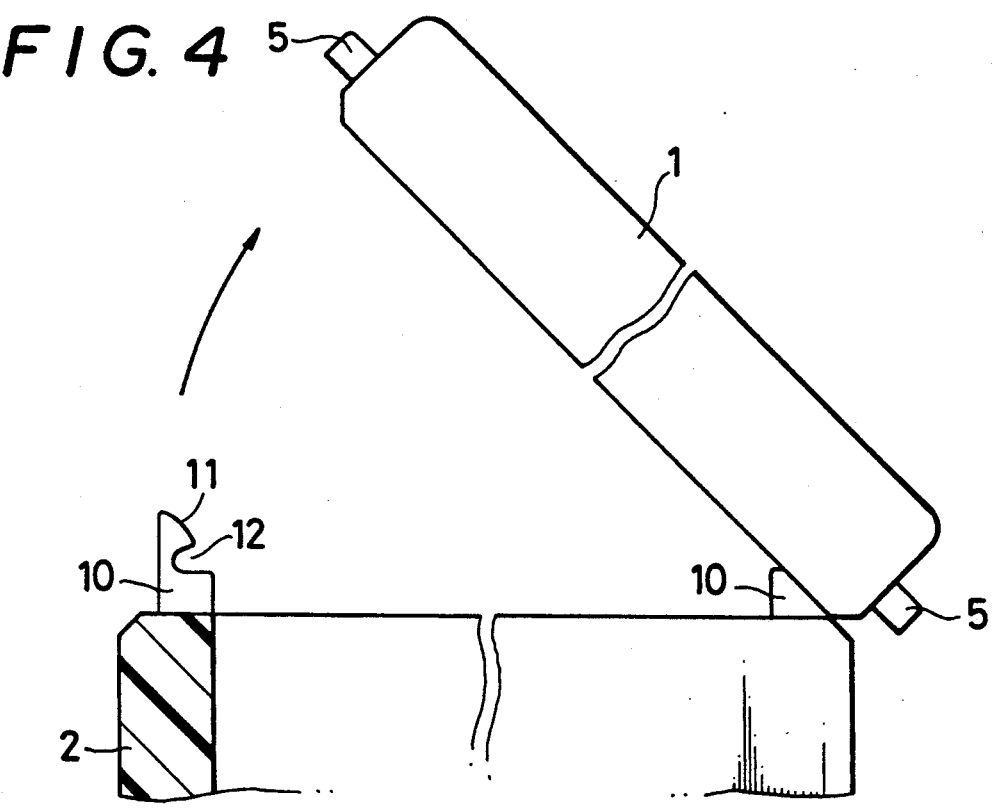
FIG. 4 is an explanatory view illustrating the lid opened in one direction.

When the lid 1 is to be opened on the left side in the drawings, for example, the operating button 5 on the left side is depressed inwardly against the resilient pressure while being accompanied by the rotary shaft part 8a of the spring means 8 idly inserted in the oblong hole 6 as illustrated in FIG. 3, and the rotary shaft part 8a of the spring means 8 is easily removed from the lock holes 12 of the lock members 10. Thereafter, the lid 1 can be opened infallibly on the left side by rotating the lid 1 upwardly about the rotary shaft part 8a of the spring means 8 kept in resilient engagement with the lock holes 12 of the lock members 10 on the right side as a fulcrum as illustrated in FIG. 4.

In the state consequently assumed, the rotary shaft part 8a on the right side is kept in secure engagement with the lock holes 12 of the corresponding lock members 10 by the resilient pressure of the spring means 8. Therefore, there is absolutely no possibility of this rotary shaft part 8a being accidentally dislocated from the lock hole parts 12.

When the lid 1 opened on the left side as described above is to be shut, the lid 1 is rotated downwardly about the rotary shaft part 8a of the spring means 8 kept in engagement with the lock hole parts 12 of the lock members 10 on the right side. As a result, the rotary shaft part 8a of the spring means 8 collides against the tapered guide parts 11 of the lock members 10 on the left side and, by the action of the guide parts 11, automatically comes into engagement with the lock holes 12 of the lock members 10. Thus, the lid 1 assumes an infallibly shut state.

Figure 5:
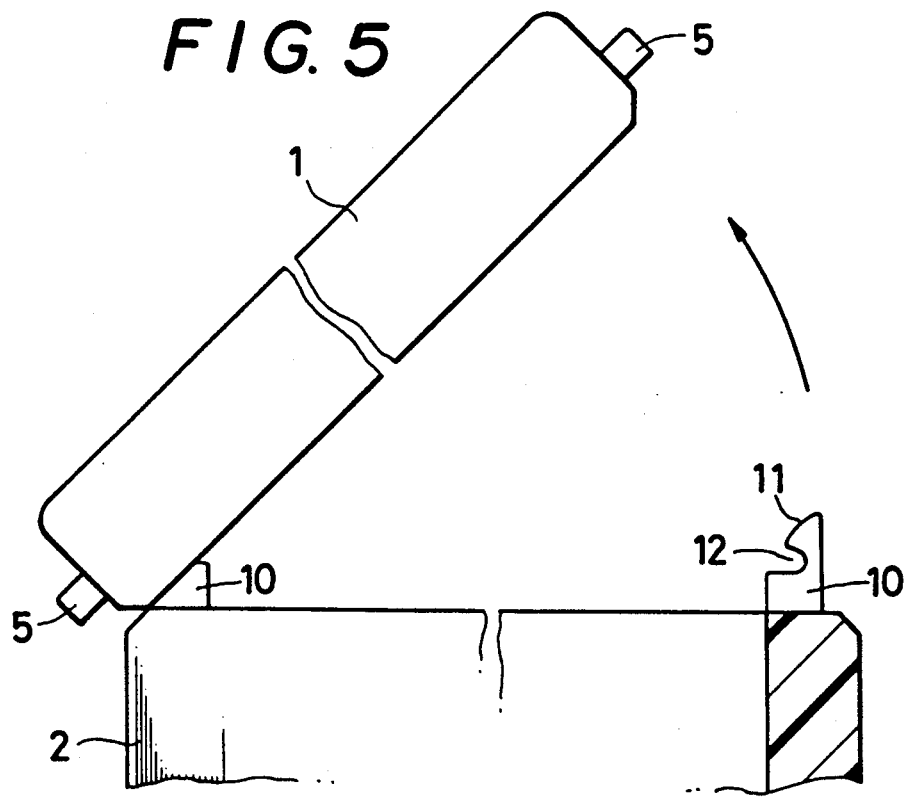
FIG. 5 is an explanatory view illustrating the lid opened in the opposite direction.
Figure 6:
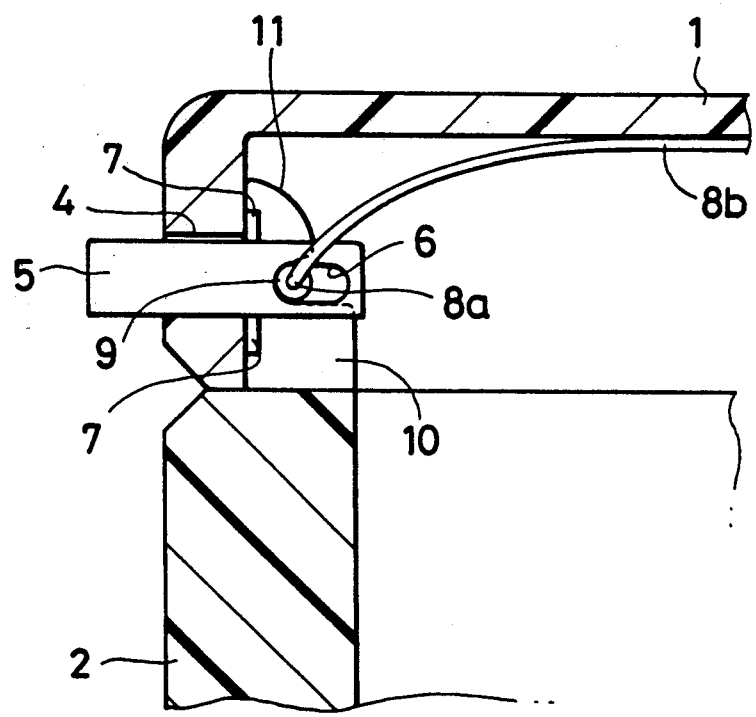
FIG. 6 is an enlarged cross section illustrating another layout of the spring means.

When the lid 1 is to be opened conversely on the right side in the drawings, the operating button 5 on the right side is depressed inwardly against the resilient pressure while being accompanied by the rotary shaft part 8a of the spring means 8 idly inserted in the oblong hole 6, then the rotary shaft part 8a of the spring means 8 is easily removed from the lock holes 12 of the lock members 10. Thereafter, the lid 1 can be infallibly opened on the right side by rotating the lid 1 upwardly, as illustrated in FIG. 5, about the rotary shaft part 8a of the spring means 8 which is kept in engagement with the lock holes 12 of the lock members 10 on the left side as a fulcrum.

Again in this case, the lid 1 in the open state can be moved to a shut state by rotating the lid 1 downwardly causing the rotary shaft part 8a of the spring means 8 to be automatically brought into engagement with the lock holes 12 of the lock members 10 by virtue of the action of the tapered guide parts 11 of the lock members 10.

In this embodiment, as shown in FIG. 2, an empty space 13 for allowing a large bend of the resilient parts 8b of the spring means 8 is interposed between the resilient parts 8b of the rectangular spring means 8 and the bottom of the depressed part 3 of the lid 1 and the spring means 8 is disposed inside the depressed part 3 of the lid 1. When the lid 1 needs to be removed from the box body 2, this removal can be easily attained by simultaneously depressing the operating buttons 5 on the opposite sides inwardly and removing the opposite rotary shaft parts 8a of the spring means 8 together from the lock holes 12 of the lock members 10 by making positive use of the aforementioned empty space 13.

Where the lid 1 need not be removable from the box body 2, the lid switching device may be constructed so as to prevent the two rotary shaft parts 8a of the spring means 8 from being simultaneously removed from the lock holes 12 of the lock members 10 by disposing the resilient parts 8b of the spring means 8 contiguously to the bottom of the depressed part 3 of the lid 1, thereby restraining the amount which the resilient parts 8b can bend inside the depressed part 3. Particularly in this case, the shut state of the lid 1 will be even more secure because the strong resilient pressure of the spring means 8 can be positively utilized in the generation of the shutting force. Alternatively, the lid switching device may be constructed such that a small empty space is interposed between the resilient parts 8b of the spring means 8 and the bottom of the depressed part 3 so that inward depression of one of the operating buttons 5 allows the resilient parts 8b to be contiguous to the bottom of the depressed part 3 of the lid 1, but prevents the other operating button from being depressed inwardly.

In the embodiments described above, the rotary shaft parts 8a destined to serve as the fulcrums of rotation of the lid 1 are integrally disposed on opposite sides of the rectangular spring means 8 for the purpose of simplifying the overall construction of the device. It is, of course, possible to form the rotary shaft parts 8a and the resilient parts 8b independently of each other and assemble them into the rectangular spring mean 8.

Further, the embodiment have been applied to the lid of an automobile console box. of course, the present invention need not be limited to this particular application but may be easily be embodied in a door of a refrigerator designed to be opened and shut in two directions and in various other lids and doors.

Owing to the adoption of the construction described above, the present invention enables a lid movably disposed on an opening of a box body to be opened and shut in two directions by making use of the resilient pressure of a spring means and, therefore, ensures infallible opening and shutting motions and open and shut states at all times with a click. Even when the opening and shutting motions are frequently repeated, the possibility of the lid switching device, unlike the conventional device, ceasing to produce smooth opening and shutting motions and infallible open and shut states is completely eliminated.

Since the lid switching device of the present invention is simplified in structure, it contributes to lowering the cost of equipment.

What is claimed is:

1. A switching device for use in opening and shutting a lid, having through holes in opposite sides thereof, on a box body in either of two directions, comprising:
   a pair of operating buttons adapted to be independently supported in the through holes of the lid, each of said operating buttons having an oblong hole formed therein and a stopper part mounted thereon for preventing said operating buttons from being pushed outwardly through the through holes beyond a predetermined extent;
   spring means for resiliently urging said operating buttons outwardly away from one another, said spring means comprising a rectangular wire spring adapted to be disposed in an inner portion of the lid in a flexed fashion, said rectangular wire spring including a pair of oppositely disposed resilient parts formed integrally with a pair of oppositely disposed rotary shaft parts which are loosely fitted in said oblong holes, respectively; and
   a pair of upright lock members adapted to be fixed on opposing edges of a periphery of the box body, each of said lock members having a U-shaped lock hole part for detachably receiving a respective one of said rotary shaft parts, and a tapered guide part for guiding said respective one of said rotary shaft parts into said U-shaped lock hole part.

2. A switching device according to claim 1, wherein said pair of resilient parts of said rectangular wire spring and an inner top wall of the inner portion of the lid have interposed therebetween an empty space large enough to allow said pair of resilient parts to flex sufficiently to allow both of said rotary shaft parts to be simultaneously detached from said lock parts, respectively, such that the lid can be removed from the box body.

3. A switching device according to claim 1, wherein said pair of resilient parts of said rectangular wire spring are disposed contiguously to an inner top wall of the inner portion of the lid, whereby said pair of rotary shaft parts are prevented from flexing by an amount sufficient to allow both of said rotary shaft parts to be detached simultaneously from said lock members.

4. A switching device according to claim 1, wherein said pair of resilient parts of said rectangular wire spring and a top wall of the inner portion of the lid have interposed therebetween an empty space small enough to allow said pair of resilient parts to be contiguous to the top wall of the inner portion of the lid upon inward depression of one of said pair of operating buttons but to prevent the other operating button from being depressed inwardly simultaneously with said one operating button.

5. A device comprising:
   a box body;
   a lid, having through holes in opposite sides thereof, disposed on said box body;
   a pair of operating buttons independently supported in said through holes of said lid, each of said operating buttons having an oblong hole formed therein and a stopper part mounted thereof for preventing said operating buttons from being pushed outwardly through said through holes beyond a predetermined extent;
   spring means for resiliently urging said operating buttons outwardly away from one another, said spring means comprising a rectangular wire spring disposed in an inner portion of the lid in a flexed fashion, said rectangular wire spring including a pair of oppositely disposed resilient parts formed integrally with a pair of oppositely disposed rotary shaft parts which are loosely fitted in said oblong holes, respectively; and
   a pair of upright lock members fixed on opposing edges of a periphery of said box body, each of said lock members having a U-shaped lock hole part for detachably receiving a respective one of said rotary shaft parts, and a tapered guide part for guiding said respective one of said rotary shaft parts into said U-shaped lock hole part.

6. A switching device according to claim 5, wherein said pair of resilient parts of said rectangular wire spring and an inner top wall of said inner portion of said lid have interposed therebetween an empty space large enough to allow said pair of resilient parts to flex sufficiently to allow both of said rotary shaft parts to be simultaneously detached from said lock parts, respectively, such that said lid can be removed from said box body.

7. A switching device according to claim 5, wherein said pair of resilient parts of said rectangular wire spring are disposed contiguously to an inner top wall of said inner portion of said lid, whereby said pair of rotary shaft parts are prevented from flexing by an amount sufficient to allow both of said rotary shaft parts to be detached simultaneously from said lock members.

8. A switching device according to claim 5, wherein said pair of resilient parts of said rectangular wire spring and a top wall of said inner portion of said lid have interposed therebetween an empty space small enough to allow said pair of resilient parts to be contiguous to said top wall of said inner portion of said lid upon inward depression of one of said pair of operating buttons but to prevent the other operating button from being depressed inwardly simultaneously with said one operating button.

* * * * *